(12) United States Patent
Eko

(10) Patent No.: US 11,186,237 B2
(45) Date of Patent: Nov. 30, 2021

(54) DOOR ARMREST

(71) Applicant: KASAI KOGYO CO., LTD., Kanagawa (JP)

(72) Inventor: Yasunori Eko, Tachikawa (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 0 days.

(21) Appl. No.: 17/256,584

(22) PCT Filed: Nov. 21, 2018

(86) PCT No.: PCT/JP2018/043029
§ 371 (c)(1),
(2) Date: Dec. 28, 2020

(87) PCT Pub. No.: WO2020/105148
PCT Pub. Date: May 28, 2020

(65) Prior Publication Data
US 2021/0268880 A1    Sep. 2, 2021

(51) Int. Cl.
*B60R 13/02* (2006.01)
*B60J 5/04* (2006.01)
(Continued)

(52) U.S. Cl.
CPC ......... *B60R 13/0243* (2013.01); *B60J 5/0493* (2013.01); *B60N 2/78* (2018.02); *B60N 3/026* (2013.01); *B60J 5/0413* (2013.01)

(58) Field of Classification Search
CPC ...... B60J 5/0413; B60R 13/0243; B60N 3/02; B60N 3/023
(Continued)

(56) References Cited

U.S. PATENT DOCUMENTS

2015/0035310 A1* 2/2015 Yamaguchi ......... B60R 13/0206
                                                                  296/153
2018/0065519 A1* 3/2018 Inami .................. B60R 13/0243
(Continued)

FOREIGN PATENT DOCUMENTS

CN      203752848 U      8/2014
JP     H11-247499 A      9/1999
(Continued)

OTHER PUBLICATIONS

International Search Report for International Application No. PCT/JP2018/043029 dated Jan. 15, 2019, Japan, 1 page.

*Primary Examiner* — Jason S Morrow
(74) *Attorney, Agent, or Firm* — United IP Counselors, LLC

(57) ABSTRACT

An armrest upper part covering an upper portion of an armrest lower part includes a front end portion adjacent to a switch finisher and an engagement claw portion extending from the front end portion. An upper part of the engagement claw portion is covered with the switch finisher. At the armrest lower part, a fixing portion for engagement with the engagement claw portion is provided. At a back surface of the switch finisher adjacent to a front of the armrest upper part and covering the upper portion of the armrest lower part, a restriction piece is provided at a position facing the fixing portion via the engagement claw portion. The restriction piece restricts detachment of the engagement claw portion from the fixing portion.

9 Claims, 5 Drawing Sheets

(51) Int. Cl.
  *B60N 3/02* (2006.01)
  *B60N 2/75* (2018.01)
(58) Field of Classification Search
  USPC .......................... 296/153, 1.02, 1.09, 146.7
  See application file for complete search history.

(56) References Cited

U.S. PATENT DOCUMENTS

| | | | | |
|---|---|---|---|---|
| 2018/0290603 | A1* | 10/2018 | Gillay | B60J 5/0413 |
| 2019/0077324 | A1* | 3/2019 | Dunham | B60N 2/78 |
| 2019/0135092 | A1* | 5/2019 | Mizuno | B60R 13/0243 |
| 2020/0408008 | A1* | 12/2020 | Nishizuka | E05B 81/77 |
| 2021/0188194 | A1* | 6/2021 | Koehler | B60J 5/0468 |

FOREIGN PATENT DOCUMENTS

| | | | |
|---|---|---|---|
| JP | 2001-262935 A | 9/2001 | |
| JP | 2014-205388 A | 10/2014 | |
| JP | 2016-037152 A | 3/2016 | |

\* cited by examiner

DOOR ARMREST

CROSS-REFERENCE TO RELATED APPLICATIONS

This application is a National Stage Entry application of PCT International Application No. PCT/JP2018/043029, filed on Nov. 21, 2018, the entire contents of which are hereby incorporated by reference.

BACKGROUND

1. Technical Field

The present invention relates to a door armrest.

2. Description of the Background

There has been a conventionally known vehicle door trim that covers a vehicle interior side in a vehicle body panel. The vehicle door trim is provided with a door armrest having a required length along the vehicle front-rear direction (refer to Japanese Patent Application Laid-open Publication No. 2001-262935, for example). The door armrest serves as an armrest for an occupant. At a door trim body, an armrest lower part is integrally formed so as to swell to a vehicle interior side. An upper portion of the armrest lower part is covered with an armrest upper part and a switch finisher. The armrest upper part and the switch finisher are arranged adjacent to each other in the vehicle front-rear direction, and the armrest upper part is positioned on a rear side of the switch finisher.

At a boundary between the armrest upper part and the switch finisher, a part of a front end portion of the armrest upper part extends to a back-surface side of the switch finisher. The armrest upper part is configured such that the part of the front end portion of the armrest upper part overlaps with a back surface of the switch finisher. At the armrest upper part, a pull handle is provided. The pull handle serves as a door pull at the time of opening and closing a side door.

BRIEF SUMMARY

Incidentally, when the pull handle is pulled to the vehicle interior side, force input to the pull handle causes the armrest upper part to be also pulled to the vehicle interior side. Thereby, the front end portion of the armrest upper part entering the back-surface side of the switch finisher is detached from the switch finisher in some cases. As a result, there is a disadvantage that required performance of a product cannot be sufficiently met.

Meanwhile, there is a considered method of fixing the armrest upper part to the armrest lower part by screw-fastening or welding, thereby suppressing detachment of the armrest upper part. However, in this method, not only additional screws and welding points are necessary, but also the number of manufacturing steps is increased, leading to a cost increase.

In view of such a matter, the present invention has been made. An object of the present invention is to provide a door armrest in which detachment of an armrest upper part is suppressed, and thereby, required performance of a product can be met.

In order to solve such a problem, the present invention provides a door armrest that includes an armrest lower part formed so as to swell to a vehicle interior side, an armrest upper part covering an upper portion of the armrest lower part, and a switch finisher provided adjacent to a front of the armrest upper part and covering the upper portion of the armrest lower part together with the armrest upper part. Here, the armrest upper part includes a front end portion adjacent to the switch finisher and includes an engagement claw portion extending from the front end portion, and an upper part of the engagement claw portion is covered with the switch finisher. At the armrest lower part, a fixing portion for engagement with the engagement claw portion is provided. At a back surface of the switch finisher, a restriction portion is provided at a position facing the fixing portion via the engagement claw portion, and the restriction portion restricts the engagement claw portion from being detached from the fixing portion.

Here, in the present invention, preferably, the engagement claw portion includes a claw body and a projection claw. The claw body includes a base portion projecting from the front end portion to a front side and an extension portion extending from the base portion in a vehicle lateral direction. The projection claw is provided at the extension portion, and has a projection shape projecting to a front side. The claw body has flexibility such that a distal end of the extension portion is allowed to bend to front and rear sides.

Further, in the present invention, preferably, a direction in which the armrest upper part is fitted to the armrest lower part corresponds to the vehicle lateral direction.

Furthermore, in the present invention, preferably, the restriction portion is provided so as to hang downward from the back surface of the switch finisher.

In addition, in the present invention, preferably, a direction in which the switch finisher is fitted to the armrest lower part corresponds to a vehicle up-down direction.

According to a door armrest of the present invention, the restriction portion is provided, thereby enabling suppression of detachment of the armrest upper part. Thus, required performance of a product can be met.

DETAILED DESCRIPTION

Figure 1:
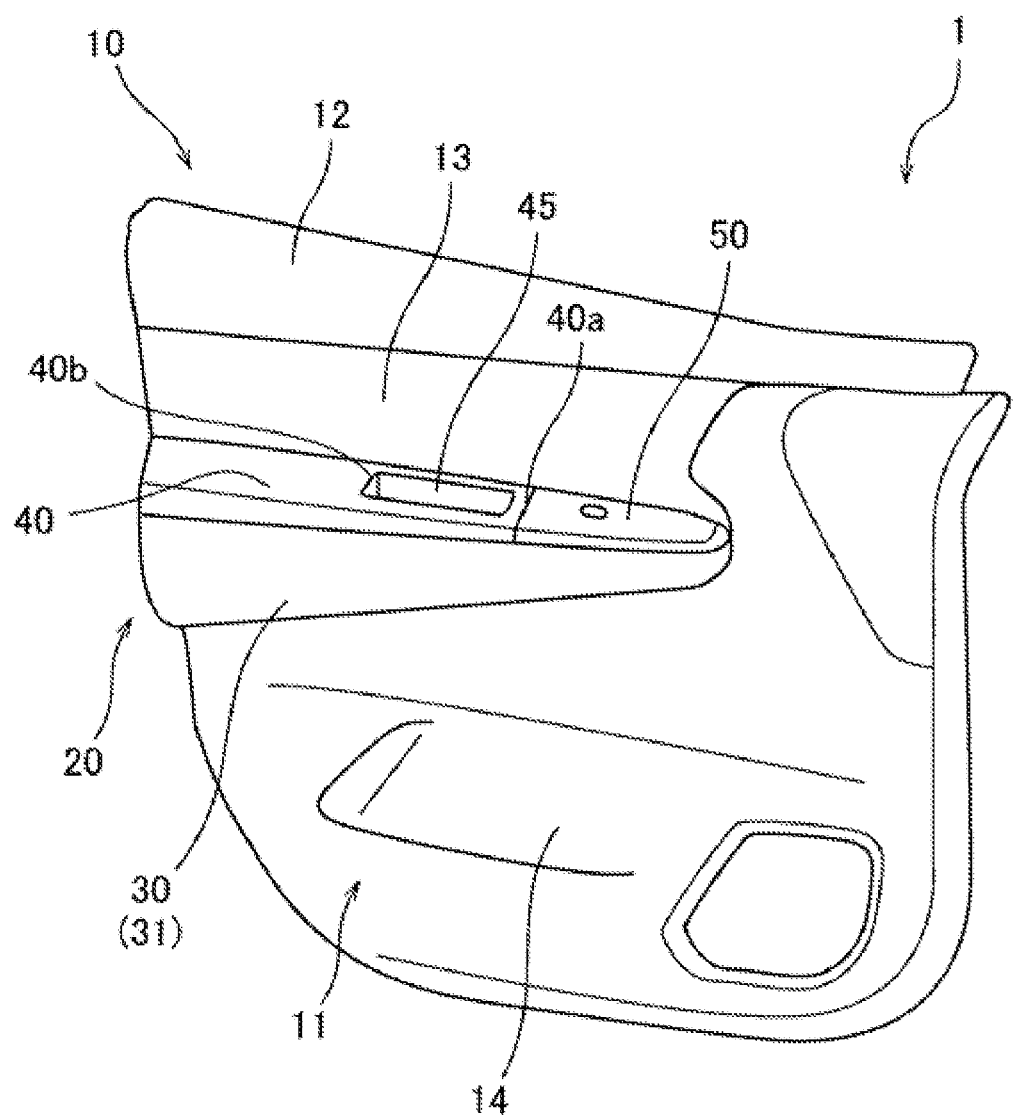
FIG. 1 is a perspective view schematically depicting a side door according to the present embodiment.
Figure 2:
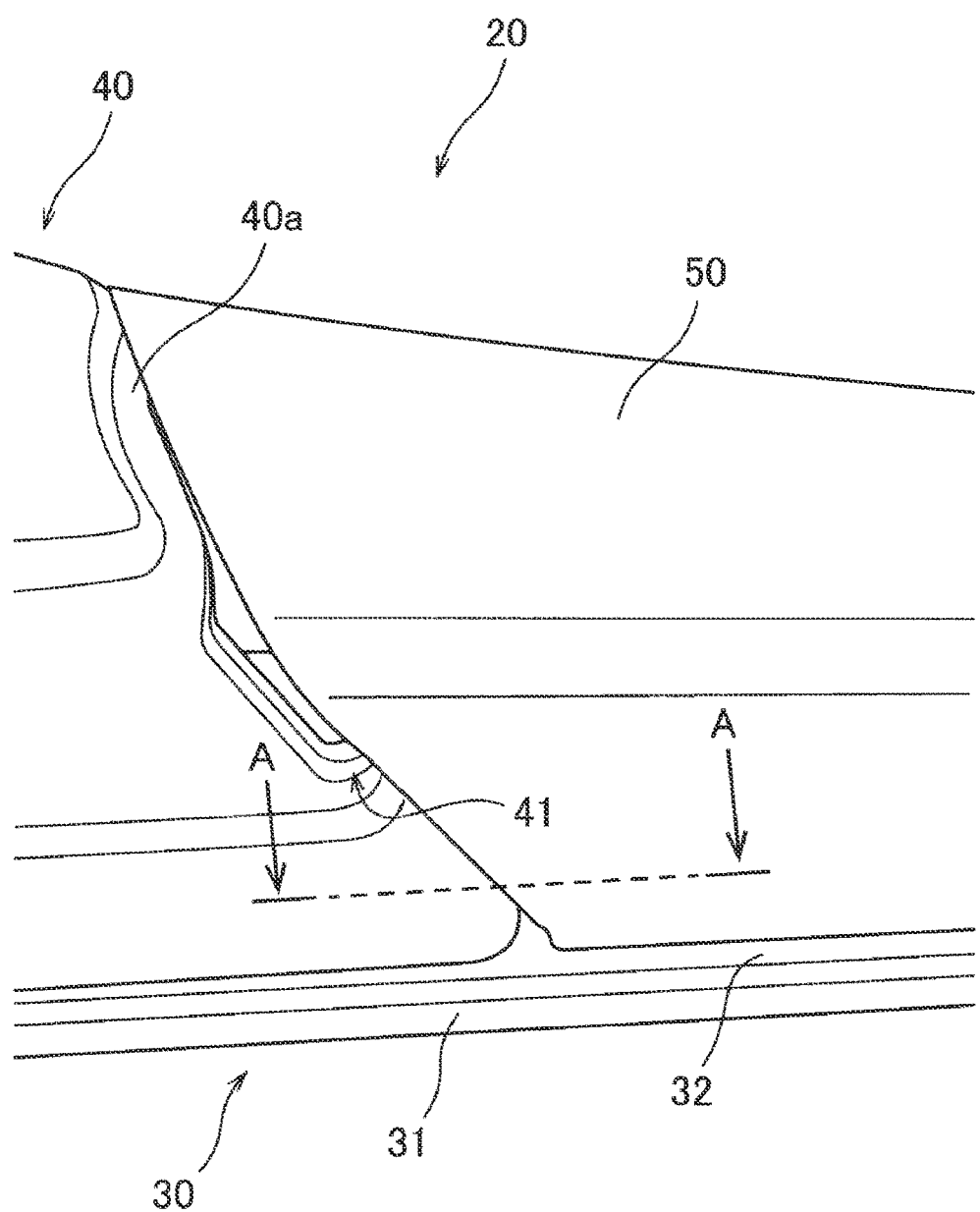
FIG. 2 is an enlarged illustration depicting a main part of a door armrest.
Figure 3:
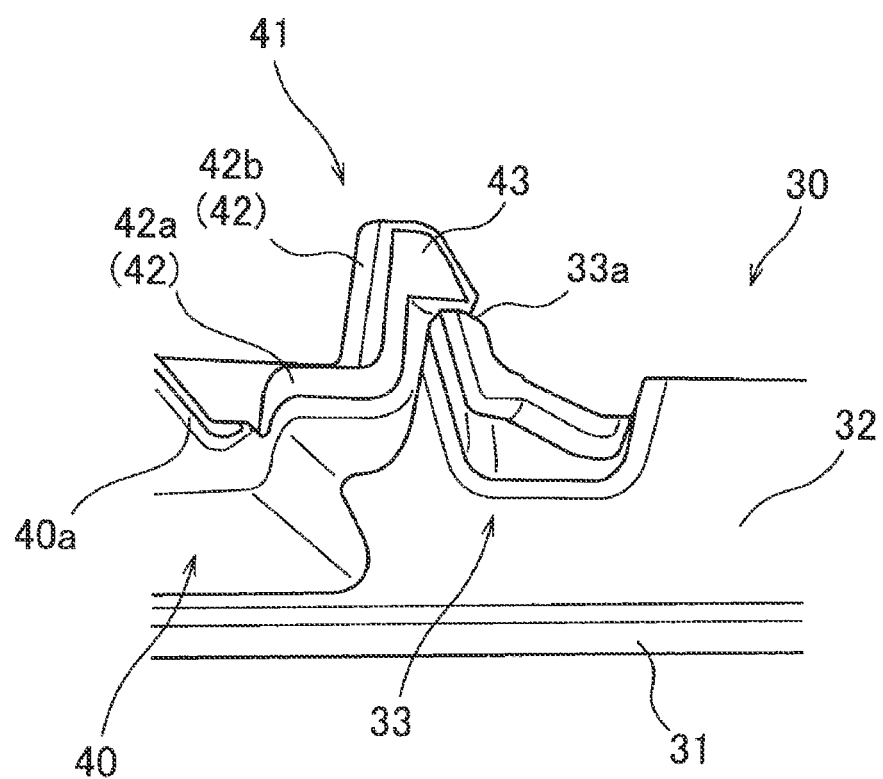
FIG. 3 is an illustration depicting an armrest lower part and an armrest upper part in a state of being fitted to each other.
Figure 4:
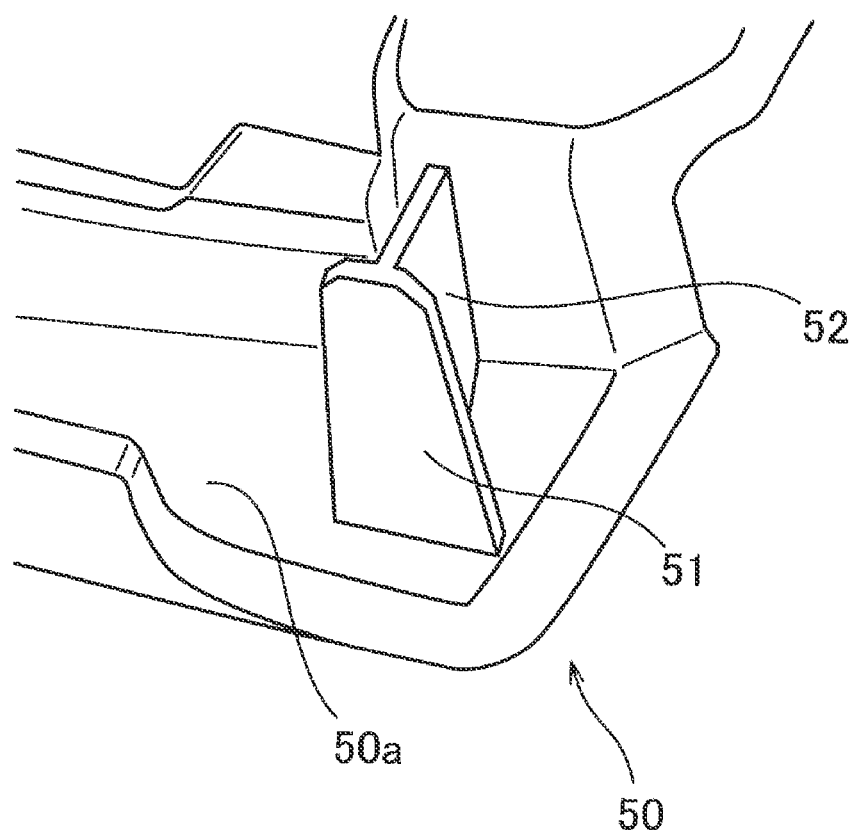
FIG. 4 is an illustration depicting a back-surface side of a switch finisher.
Figure 5:
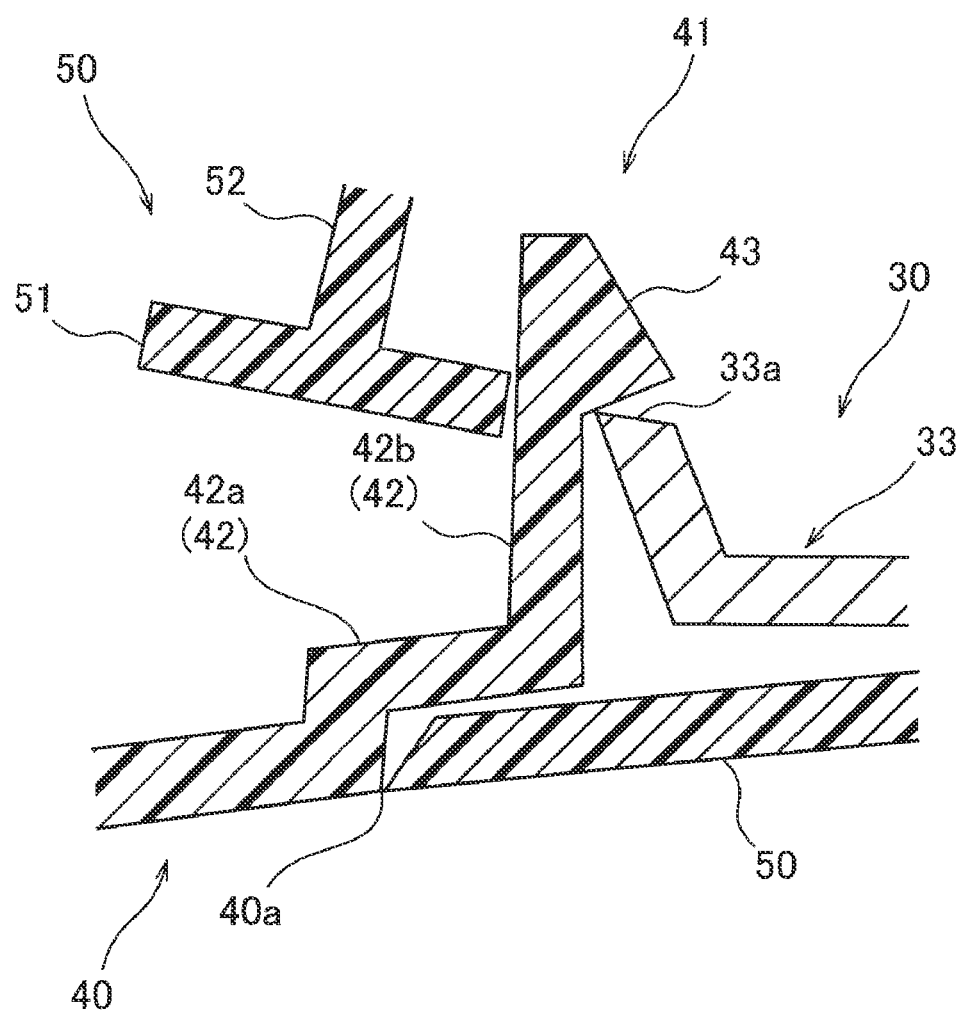
FIG. 5 is an illustration schematically depicting a section at the line segment AA illustrated in FIG. 2.

FIG. 1 is a perspective view schematically depicting a side door 1 according to the present embodiment. FIG. 2 is an enlarged illustration depicting a main part of a door armrest 20. FIG. 3 is an illustration depicting an armrest lower part 30 and an armrest upper part 40 in a state of being fitted to each other. FIG. 4 is an illustration depicting a back-surface side of a switch finisher 50. FIG. 5 is an illustration schematically depicting a section at the line segment AA illustrated in FIG. 2.

The side door 1 of a vehicle includes, as main constituents, a door outer panel and a door inner panel that are door panels. To a vehicle interior side in the door inner panel, a door trim 10 is attached. The door trim 10 is a vehicle interior member.

A trim body 11 forming a main part of the door trim 10 is constituted by a plurality of divided trims. In the present embodiment, the trim body 11 is constituted by an upper trim 12, a center trim 13, and a lower trim 14 that are arranged in three stages in the up-down direction. The upper trim 12 corresponds to an upper portion of a vehicle interior side in the side door 1, the center trim 13 corresponds to a center portion of the vehicle interior side in the side door 1, and the lower trim 14 corresponds to a lower portion of the vehicle interior side in the side door 1. The individual trims 12, 13, and 14 are each formed by molding in which an appropriate synthetic resin material is used. The trims 12, 13, and 14 each include a vehicle-interior-side face (surface) to which a skin member serving as both a cushion and a surface decoration is adhered. These trims 12, 13, and 14 are fixed to each other, and thus, the trim body 11 is configured as one structural body.

At the door trim 10, a door armrest 20 is provided along the vehicle front-rear direction. An occupant seated on a seat can take a comfortable sitting posture by resting his or her elbow on the door armrest 20. In the present embodiment, the door armrest 20 is provided at a joint portion between the center trim 13 and the lower trim 14.

The door armrest 20 is constituted by an armrest lower part 30, an armrest upper part 40, and a switch finisher 50.

The armrest lower part 30 is formed integrally at an upper portion of the lower trim 14. The armrest lower part 30 is constituted by a swell portion 31 and a shelf portion 32.

Apart of the lower trim 14 protrudes to a vehicle interior side, thereby forming the swell portion 31 so as to swell to the vehicle interior side.

The shelf portion 32 extends from an upper end of the swell portion 31 in the vehicle lateral direction, and forms a surface along the horizontal direction. The shelf portion 32 is partially provided so as to be exclusively at a necessary area. An upper surface of the shelf portion 32 is covered with the armrest upper part 40 and the switch finisher 50.

The armrest upper part 40 constitutes the door armrest 20 together with the armrest lower part 30. The armrest upper part 40 is arranged at the shelf portion 32 of the armrest lower part 30 so as to cover an upper portion of the armrest lower part 30. To a surface of the armrest upper part 40, a skin member is adhered. The skin member serves as both a cushion and a surface decoration.

At the armrest upper part 40, a handle opening 40b is formed. Into the handle opening 40b, a pull handle 45 formed in a rectangular-cup shape is fitted. The pull handle 45 is a portion that serves as a door pull at the time of opening and closing the side door 1.

The armrest upper part 40 is configured so as to be fitted to the armrest lower part 30 by being moved in the vehicle lateral direction from a lateral side of the armrest lower part 30. The fitting of the armrest upper part 40 is performed before the switch finisher 50 is fitted to the armrest lower part 30.

The switch finisher 50 constitutes the door armrest 20 together with the armrest lower part 30 and the armrest upper part 40. The switch finisher 50 is arranged at the shelf portion 32 of the armrest lower part 30 so as to cover the upper portion of the armrest lower part 30. The switch finisher 50 arranged at the shelf portion 32 is adjacent to a front of the armrest upper part 40. At the switch finisher 50, switches for performing window operation and other operation are arranged.

The switch finisher 50 is configured so as to be fitted to the armrest lower part 30 by being moved downward from an upper side of the armrest lower part 30. The fitting of the switch finisher 50 is performed after the fitting of the armrest upper part 40 is performed.

In the door armrest 20 having such a configuration, the armrest upper part 40 includes a front end portion 40a as a boundary with the switch finisher 50, and includes an engagement claw portion 41 provided at the front end portion 40a. The engagement claw portion 41 extends from the front end portion 40a to a front side, and is positioned on a back-surface side of the switch finisher 50. In other words, an upper part of the engagement claw portion 41 is covered with the switch finisher 50.

The engagement claw portion 41 is constituted by a claw body 42 and a projection claw 43. The claw body 42 includes a base portion 42a projecting from the front end portion 40a to the front side, and an extension portion 42b extending in the vehicle lateral direction toward the door panel so as to bend from the base portion 42a. In consideration of fitting of the armrest upper part 40 to the armrest lower part 30, the engagement claw portion 41 has flexibility such that a distal end of the extension portion 42b is allowed to bend to front and rear sides.

The projection claw 43 is provided at a side surface of a distal-end-side portion of the extension portion 42b. The projection claw 43 has a projection shape so as to project to the front side.

Meanwhile, at the shelf portion 32 of the armrest lower part 30, a fixing portion 33 is provided. The fixing portion 33 is a counterpart member with which the engagement claw portion 41 extending from the front end portion 40a of the armrest upper part 40 engages. The fixing portion 33 is formed so as to be adjacent to a front of the extension portion 42b of the engagement claw portion 41. At an end portion of the fixing portion 33, a claw reception portion 33a is formed. When force to the vehicle interior side acts on the engagement claw portion 41, the claw reception portion 33a receives the projection claw 43 of the engagement claw portion 41 and exerts force for engagement with the engagement claw portion 41. In order to have rigidity required for the engagement force, the fixing portion 33 is formed in a bent shape, for example, a substantially L-shape, In addition, at a back surface 50a of the switch finisher 50, a restriction piece 51 is provided. The restriction piece 51 is a thin plate-shaped member, for example, and is formed so as to hang down from the back surface 50a of the switch finisher 50. The restriction piece 51 is arranged at a position facing the fixing portion 33 via the extension portion 42b of the engagement claw portion 41. In other words, the restriction piece 51 is formed so as to be adjacent to a rear of the extension portion 42b of the engagement claw portion 41. The restriction piece 51 fixes the extension portion 42b by sandwiching the extension portion 42b between the fixing portion 33 and the restriction piece 51, and thereby restricts bending deformation of the engagement claw portion 41. In order to have rigidity necessary for restricting bending deformation, the restriction piece 51 is provided with a stiffening rib 52 connecting to a body portion of the switch finisher 50.

In the door armrest 20 having such a configuration, when the pull handle 45 is pulled to the vehicle interior side in the course of opening and closing of the side door 1, the armrest upper part 40 is also pulled to the vehicle interior side by receiving force input to the pull handle 45. When the armrest upper part 40 is pulled, the claw body 42 thereby tries to bend and deform to the rear side such that the projection claw 43 is detached from the claw reception portion 33a of the fixing portion 33.

In this case, on the rear side of the engagement claw portion 41, the restriction piece 51 exists, the restriction piece being provided at the back surface 50a of the switch finisher 50. Since the restriction piece 51 restricts bending deformation of the claw body 42, the projection claw 43 is also restricted from being detached from the claw reception portion 33a of the fixing portion 33. Thus, a state where the engagement claw portion 41 engages with the fixing portion 33 is maintained. As a result, a situation where the armrest upper part 40 is detached from the switch finisher 50 is suppressed.

Incidentally, bending deformation of the engagement claw portion 41 is due to flexibility of the claw body 42. For this reason, it can be considered to make the claw body 42 have rigidity, thereby maintaining engagement between the engagement claw portion 41 of the armrest upper part 40 and the fixing portion 33 of the armrest lower part 30.

However, in the present embodiment, the armrest upper part 40 is configured so as to be fitted along the vehicle lateral direction from the lateral side of the armrest lower part 30. In this case, when the armrest upper part 40 is fitted, the projection claw 43 of the engagement claw portion 41 interferes with the fixing portion 33. For this reason, in order to enable the armrest upper part 40 to be fitted to the armrest lower part 30, it is necessary to adopt a structure in which the claw body 42 is bent and deformed such that the projection claw 43 is moved over the fixing portion 33. In addition, when the projection claw 43 is moved over the fixing portion 33, and the engagement claw portion 41 engages with the fixing portion 33, the armrest upper part 40 and the armrest lower part 30 are brought into a state of being temporarily held by each other. Thus, at the time of fitting of the switch finisher 50, the fitting work can be performed stably. Therefore, in the present embodiment, while flexibility of the claw body 42 is allowed, the restriction piece 51 restricts bending deformation of the engagement claw portion 41 after the armrest upper part 40 and the switch finisher 50 are fitted.

As described above, in the door armrest 20 according to the present embodiment, while a structure in which the engagement claw portion 41 of the armrest upper part 40 is made to engage with the fixing portion 33 of the armrest lower part 30 is adopted, the restriction piece 51 is provided at the back surface 50a of the switch finisher 50. This restriction piece 51 exists at the position facing the fixing portion 33 via the engagement claw portion 41, and restricts the engagement claw portion 41 from being detached from the fixing portion 33. Accordingly, a state where the engagement claw portion 41 engages with the fixing portion 33 is maintained. Thereby, a situation where the armrest upper part 40 is detached from the switch finisher 50 can be suppressed, and thus, performance required for the door armrest 20 can be sufficiently met.

Further, in the present embodiment, the engagement claw portion 41 includes the claw body 42 and the projection claw 43. Here, the claw body 42 includes the base portion 42a projecting from the front end portion 40a to the front side and the extension portion 42b extending in the vehicle lateral direction so as to bend from the base portion 42a. Meanwhile, the projection claw 43 is provided at the extension portion 42b, and has the projection shape projecting to the front side. In this case, the claw body 42 has flexibility such that the distal end of the extension portion 42b is allowed to bend to the front and rear sides.

According to this configuration, the claw body 42 has flexibility, and thus, when the pull handle 45 is pulled to the vehicle interior side, the claw body 42 receives force input to the pull handle 45 and tries to bend and deform to the rear side. However, on the rear side of the engagement claw portion 41, the restriction piece 51 exists, and thus, bending deformation of the claw body 42 is restricted by the restriction piece 51, and the projection claw 43 is also restricted from being detached from the claw reception portion 33a of the fixing portion 33. For this reason, a state where the engagement claw portion 41 of the armrest upper part 40 engages with the fixing portion 33 of the armrest lower part 30 is maintained, and thus, a situation where the armrest upper part 40 is detached from the switch finisher 50 can be suppressed.

Further, in the present embodiment, a direction in which the armrest upper part 40 is fitted to the armrest lower part 30 corresponds to the vehicle lateral direction.

According to this configuration, when the armrest upper part 40 is fitted to the armrest lower part 30, the projection claw 43 of the engagement claw portion 41 interferes with the fixing portion 33. In this regard, according to the present embodiment, the claw body 42 of the engagement claw portion 41 is bent and deformed, and thereby, the projection claw 43 can be moved over the fixing portion 33. Accordingly, the armrest upper part 40 can be fitted to the armrest lower part 30. As a result, both fitting ability and required performance of the door armrest 20 can be compatibly fulfilled.

Further, in the present embodiment, the restriction piece 51 is provided so as to hang downward from the back surface 50a of the switch finisher 50.

According to this configuration, the restriction piece 51 can be appropriately arranged at the position facing the fixing portion 33 via the engagement claw portion 41.

Further, a direction in which the switch finisher 50 is fitted to the armrest lower part 30 corresponds to the vehicle up-down direction.

According to this configuration, the restriction piece 51 can be inserted from an upper side into a space existing on the rear side of the engagement claw portion 41. Thereby, the restriction piece 51 can be appropriately arranged at the position facing the fixing portion 33 via the engagement claw portion 41.

Although the vehicle door trim of the present embodiment is described above, the present invention is not limited to this embodiment, and various modifications can be made within the scope of the present invention.

REFERENCE SIGNS LIST

1 Side door
10 Door trim
11 Trim body
12 Upper trim
13 Center trim
14 Lower trim
20 Door armrest
30 Armrest lower part
31 Swell portion
32 Shelf portion
33 Fixing portion
33a Claw reception portion
40 Armrest upper part
40a Front end portion
40b Handle opening
41 Engagement claw portion 42 Claw body
42*a* Base portion
42*b* Extension portion
43 Projection claw
45 Pull handle
50 Switch finisher
50*a* Back surface
51 Restriction piece
52 Stiffening rib

The invention claimed is:

1. A door armrest comprising:
an armrest lower part formed so as to swell to a vehicle interior side;
an armrest upper part covering an upper portion of the armrest lower part; and
a switch finisher provided adjacent to a front of the armrest upper part and covering the upper portion of the armrest lower part together with the armrest upper part,
wherein the armrest upper part includes a front end portion adjacent to the switch finisher and includes an engagement claw portion extending from the front end portion, and an upper part of the engagement claw portion is covered with the switch finisher,
at the armrest lower part, a fixing portion for engagement with the engagement claw portion is provided, and
at a back surface of the switch finisher, a restriction portion is provided at a position facing the fixing portion via the engagement claw portion, and the restriction portion restricts the engagement claw portion from being detached from the fixing portion.

2. The door armrest according to claim 1,
wherein the engagement claw portion includes:
a claw body that includes a base portion projecting from the front end portion to a front side and an extension portion extending from the base portion in a vehicle lateral direction; and
a projection claw provided at the extension portion and having a projection shape projecting to a front side, and
the claw body has flexibility such that a distal end of the extension portion is allowed to bend to front and rear sides.

3. The door armrest according to claim 2,
wherein a direction in which the armrest upper part is fitted to the armrest lower part corresponds to the vehicle lateral direction.

4. The door armrest according to claim 1, wherein the restriction portion is provided so as to hang downward from the back surface of the switch finisher.

5. The door armrest according to claim 4, wherein a direction in which the switch finisher is fitted to the armrest lower part corresponds to a vehicle up-down direction.

6. The door armrest according to claim 2, wherein the restriction portion is provided so as to hang downward from the back surface of the switch finisher.

7. The door armrest according to claim 3, wherein the restriction portion is provided so as to hang downward from the back surface of the switch finisher.

8. The door armrest according to claim 6, wherein a direction in which the switch finisher is fitted to the armrest lower part corresponds to a vehicle up-down direction.

9. The door armrest according to claim 7, wherein a direction in which the switch finisher is fitted to the armrest lower part corresponds to a vehicle up-down direction.

* * * * *